(12) United States Patent
Devaraj et al.

(10) Patent No.: US 11,082,259 B1
(45) Date of Patent: Aug. 3, 2021

(54) SYSTEM AND METHOD FOR CENTRALIZED POLICY ENFORCEMENT FOR NETWORK SEGMENTATION

(71) Applicant: Arista Networks, Inc., Santa Clara, CA (US)

(72) Inventors: Naveen Kumar Devaraj, San Jose, CA (US); Chandrashekhar Appanna, Austin, TX (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/836,811

(22) Filed: Mar. 31, 2020

(51) Int. Cl.
*H04L 12/46* (2006.01)
*H04L 29/06* (2006.01)
*H04L 12/733* (2013.01)
*H04L 12/713* (2013.01)

(52) U.S. Cl.
CPC ...... *H04L 12/4641* (2013.01); *H04L 12/4633* (2013.01); *H04L 45/20* (2013.01); *H04L 45/586* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 2010/0192202 A1* | 7/2010 | Ker | H04L 63/101 726/4 |
| 2020/0136849 A1* | 4/2020 | Zhang | H04L 61/103 |
| 2021/0075767 A1* | 3/2021 | Jain | H04L 61/25 |

OTHER PUBLICATIONS

Russel Kelley, "L3 EVPN VXLAN Configuration Guide", EVPN VXLAN Type-5 Layer 3 VPN (With Dual-Homed Layer 2 and Layer 3 Sites), Aug. 6, 2018 (31 pages).

* cited by examiner

*Primary Examiner* — Christine T Duong
(74) *Attorney, Agent, or Firm* — Chamberlain, Hrdlicka, White, Williams & Aughtry

(57) ABSTRACT

In general, embodiments of the invention relate to providing a scalable network configuration to enable hosts for different tenants to communicate with each other. More specifically, embodiments of the invention relate to using a combination of per-tenant virtual routing and forwarding (VRF) tables, encapsulation, and stateless access control lists (ACLs) to enable intra-tenant and inter-tenant communication and segmentation.

20 Claims, 11 Drawing Sheets

US 11,082,259 B1

SYSTEM AND METHOD FOR CENTRALIZED POLICY ENFORCEMENT FOR NETWORK SEGMENTATION

BACKGROUND

Data centers typically include multiple network devices that interconnect hosts. Each of the hosts is typically associated with a single tenant (e.g., a company or division of a company). The data centers need to enable communication between hosts associated with a given tenant. Further, depending on the data center, a first tenant may permit its hosts to selectively communicate with hosts associated with a second tenant. The selective communication is typically handled by forcing network traffic through one or more stateful firewalls. This results in a decrease in performance of the data center. Further, as the number of hosts in the data center increases, the configuration and maintenance overhead associated with the stateful firewalls increases.

SUMMARY

In general, in one aspect, the invention relates to method for processing frames in a hierarchically-structured network that includes a plurality of hosts, wherein at least one host of the plurality of hosts is associated with a first tenant and at least one host of the plurality of hosts is associated with a second tenant, and wherein the method is performed by a network device in the network, the method comprising: receiving an encapsulated frame on a first encapsulation path, wherein the first encapsulation path is associated with the first tenant, decapsulating the encapsulated frame to obtain a frame, routing the frame using a virtual routing and forwarding (VRF) table associated with the first tenant to obtain a rewritten frame, determining, based on applying an access control list (ACL) to the rewritten frame, to transmit the rewritten frame to a target host associated with the second tenant, wherein the target host is one of the plurality of hosts, based on the determining, encapsulating the rewritten frame to generate a second encapsulated frame, and transmitting the second encapsulated frame towards the target host on a second encapsulation path, wherein the second encapsulation path is associated with the second tenant.

In general, in one aspect, the invention relates to a network device, comprising: a processor, memory comprising instructions, which when executed by the processor, perform a method for processing frames, the method comprising: receiving an encapsulated frame on a first encapsulation path, wherein the first encapsulation path is associated with the first tenant, decapsulating the encapsulated frame to obtain a frame, routing the frame using a virtual routing and forwarding (VRF) table associated with a first tenant to obtain a rewritten frame, determining, based on applying an access control list (ACL) to the rewritten frame, to transmit the rewritten frame to a target host associated with the second tenant, based on the determining, encapsulating the rewritten frame to generate a second encapsulated frame; and transmitting the second encapsulated frame towards the target host on a second encapsulation path, wherein the second encapsulation path is associated with the second tenant.

In general, in one aspect, the invention relates to a method for processing frames, the method comprising: receiving an encapsulated frame, wherein the encapsulated frame is associated with a first tenant, decapsulating the encapsulated frame to obtain a frame, routing the frame using a virtual routing and forwarding (VRF) table associated with a first tenant to obtain a rewritten frame, determining, based on applying an access control list (ACL) to the rewritten frame, to transmit the rewritten frame to a first host associated with the second tenant, based on the determining, encapsulating the rewritten frame to generate a second encapsulated frame, wherein the second encapsulated frame is associated with the second tenant, and transmitting the second encapsulated frame towards the first host.

Other aspects of the invention will be apparent from the following description and the appended claims.

DETAILED DESCRIPTION

In general, embodiments of the invention relate to providing a scalable network configuration to enable hosts for different tenants to communicate with each other. More specifically, embodiments of the invention relate to using a combination of per-tenant virtual routing and forwarding (VRF) tables, encapsulation, and stateless access control lists (ACLs) to enable intra-tenant and inter-tenant communication and segmentation. In accordance with various embodiments of the invention, intra-tenant communication refers to communication between hosts that are associated with the same tenant (see e.g., FIGS. 5, 6A, 6B), while inter-tenant communication refers to communication between hosts that are associated with different tenants (see e.g., FIGS. 5, 7A, 7B).

Figure 1A:
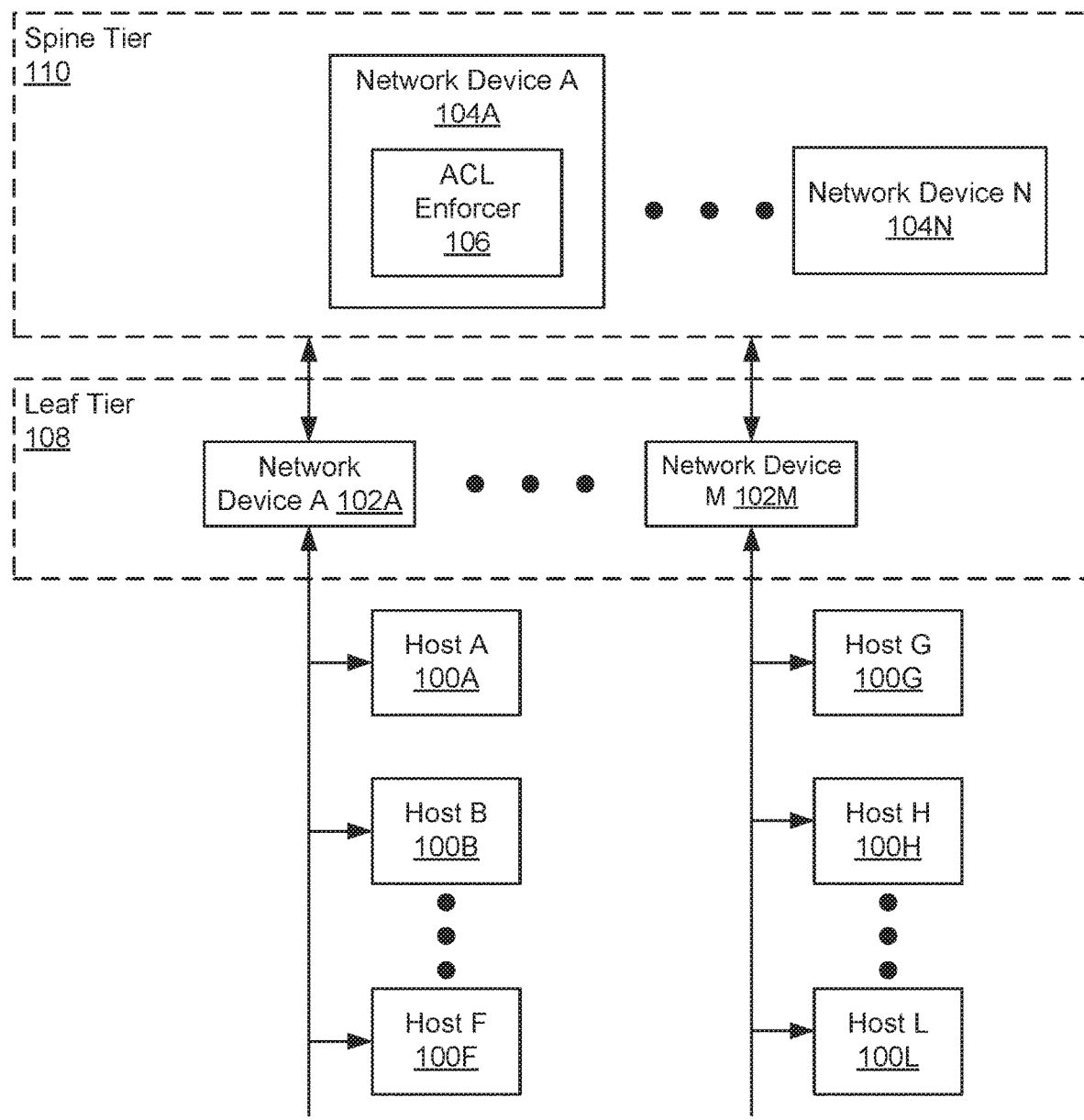
FIG. 1A shows a system in accordance with one or more embodiments of the invention.
Figure 1B:
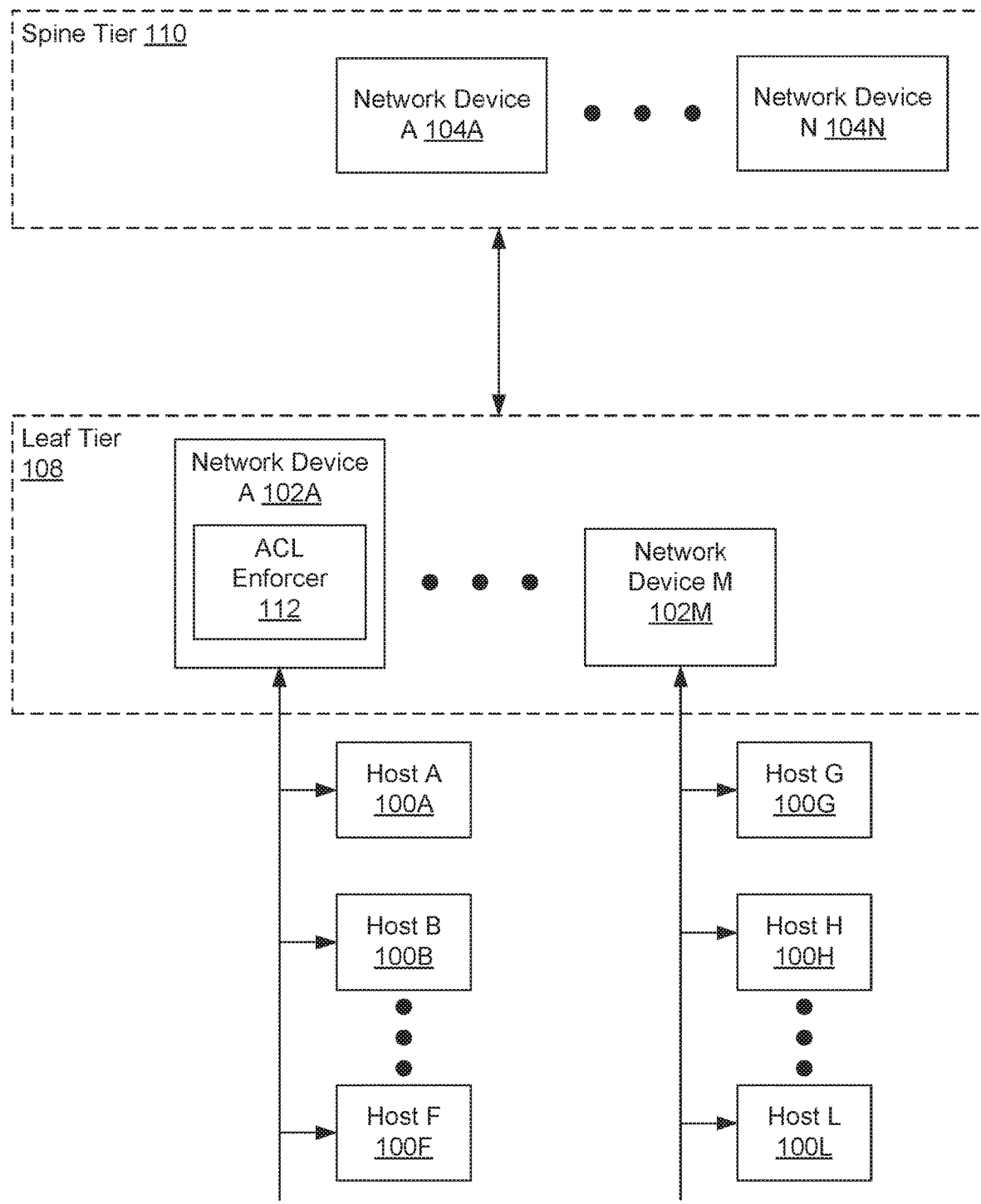
FIG. 1B show a system in accordance with one or more embodiments of the invention.

In one or more embodiments of the invention, the ACLs are implemented using ACL enforcers (see e.g., FIGS. 1A and 1B). The ACL enforcers are typically implemented on network devices that include sufficient hardware resources (e.g., processing and memory resources) to be able to maintain an ACL that covers all or substantially all of the tenants that include hosts within the data center. In this manner, a single centralized ACL may be used instead of multiple smaller ACLs, where each of the smaller ACLs only covers a portion of the rules that would be found in the single central ACL. By having a single centralized ACL, the overhead for managing the ACL is substantially decreased as compared with managing multiple smaller ACLs. More specifically, in systems that implement smaller ACLs, these ACLs are usually distributed across multiple network devices. This results in additional operational and administrative overhead. This overhead is further increased when the distributed ACLs are implemented in combination with overlay networks (e.g., networks implementing VXLAN). Further, by using ACLs (instead of stateful firewalls), the ACL enforcer is not required to maintain state associated with hosts that are involved in inter-tenant communication.

The following describes various non-limiting embodiments of the invention.

In the following description, all references to specific MAC addresses refer to a MAC address associated with a specific component in the system, e.g., a virtual machine, a server, a network device, etc. However, it should not be interpreted to mean that such a component only has one MAC address. Rather, in embodiments herein, one or more of the components may be associated with multiple MAC addresses.

In the following description, all references to specific IP addresses refer to an IP address associated with a specific component in the system, e.g., a virtual machine, a server, a network device, etc. but should not be interpreted to mean that such component only has one such IP address. Rather, in various embodiments, one or more of the components may be associated with multiple IP addresses.

FIG. 1A shows a system in accordance with one or more embodiments. The system includes one or more hosts (100A-100L), a leaf tier (108), and a spine tier (110). The aforementioned components may communicate with each other using any known or later discovered communication protocol. Further, the aforementioned components may communicate using any combination of wired and/or wireless connections and wired and/or wireless networks. Further, all the aforementioned components may be co-located in the same physical location. Alternatively, the aforementioned components may not all be co-located. Additional details regarding each of the aforementioned components are provided below.

In one embodiment of the invention, a host (100A-100L) is any physical device, or any set of devices, capable of electronically processing instructions and that includes, at least, one or more processors, memory, input and output device(s), and operative network connectivity to one or more network devices. Examples of hosts implemented as physical devices include, but are not limited to, a blade-server in a blade-server chassis, a rack server in a rack, and/or any other type of physical device with the aforementioned requirements.

In another embodiment of the invention, the host (100A-100L) may be a logical device, e.g., a virtual machine, which is executing on a physical device (as defined above). The system may include any combination of physical and/or logical hosts without departing from the invention.

In one embodiment of the invention, each host is associated with a tenant. In the context of a data center, tenants may include legal entities (e.g., companies, corporations, partnerships, etc.) or teams (or portions of a company) with operational and/or administrative segregation of a legal entity (e.g., the research and development department, the account department, etc.). Each tenant may be associated with one or more subnets (e.g., IP subnets) and each host that is associated with a given tenant may be in a subnet (or in a subnet of the subnets) of the tenant. The subnet may be an IPv4 or an IPv6 subnet without departing from the invention. The following is a non-limiting example of how hosts may be within a subset of a tenant. Turning the example, consider a scenario in which the tenant is associated with the following subnets: (i) 10.11.0.0/24, (ii) 10.12.0.0/24; and (iii) 10.13.0.0/24. Accordingly, any hosts that are associated with the tenant have IP addresses that are within one of the three aforementioned subnets. For example, host A may have an IP address of 10.11.0.100, which is in IP subnet 10.11.0.0/24. Thus, Host A is associated with the tenant.

Continuing with the discussion of FIG. 1A, each host (100A-100L) is connected (directly or indirectly) to at least one network device (e.g., network device A-M (102A, 102M)) in the leaf tier (108). In one embodiment of the invention, the network devices (102A 102M) in the leaf tier (108) may not be directly connected to each other. Alternatively, if the network devices in the leaf tier (108) implement Multichassis Link Aggregation (MLAG) protocol, then a given network device may be directly connected to one other network device in the leaf tier (108). Additional detail about network devices (which are present in both the leaf tier and the spine tier) are provided below in FIG. 2.

Each network device (102A, 102M) in the leaf tier (108) is connected to at least one network device (104A, 104N) in a spine tier (110). In embodiments herein, each network device (102A, 102M) may be connected to every other network device (104A, 104N) in the spine tier (110). Further, in some embodiments, the network devices (104A, 104N) in the spine tier (110) are not directly connected to each other. However, if the spine network devices implement MLAG, then a given network device (104A, 104N) may be directly connected to one or more other network devices (104A, 104N) in the spine tier (110).

As discussed above, embodiments of the invention utilize a centralized ACL to manage the communication between different tenants. An ACL is a set of one or more rules assigned to one or more entities (e.g., hosts, network devices, etc.) in the system (e.g., the system shown in FIGS. 1A and 1B). The ACL may be implemented as a data structure that maintains a list of active policies or rules. A policy or rule may refer to a course of action (i.e., one or more actions (described below)), pertinent to traffic management or access control, that may be applied to certain network traffic (e.g., frames) exhibiting properties or attributes that match criteria (i.e., a filter pattern (described below)).

A given active policy/rule within the ACL may include a filter pattern and one or more actions. In one embodiment of the invention, a filter pattern may refer to a set of qualifiers (e.g., attributes, properties, etc.) that may, at least in part, define certain network traffic (e.g., frames). Examples of qualifiers may include any subset or all of the following network traffic flow identifying information: link layer (i.e., layer-2 (L2)) information—e.g., a source media access control (MAC) address, a destination MAC address, etc.; network layer (i.e., layer-3 (L3)) information—e.g., a source Internet Protocol (IP) address, a destination IP address, a source virtual routing and forwarding (VRF) domain, a destination VRF domain, etc.; transport layer (i.e., layer-4 (L4)) information—e.g., a source network interface, a destination network interface, etc.; and miscellaneous information—e.g., a source virtual local area network (VLAN) tag, a destination VLAN tag, a type of service, an encapsulation protocol. Qualifiers are not limited to the aforementioned examples.

In one embodiment of the invention, an action may refer to a given course of action, which may be applied to any network traffic (e.g., frame) that exhibits qualifiers that match the filter pattern associated with the active policy or rule. Examples of an action may include, but are not limited to, a PERMIT action, which may allow any network traffic, matching the filter pattern, to proceed towards a respective destination; a DROP or DENY action, which may discard any network traffic matching the filter pattern; and a REDIRECT or NEXTHOP action, which may redirect any network traffic flow(s), matching the filter pattern, to an alternative destination (often for further inspection, processing, etc.). Other actions may be performed without departing from the invention.

Embodiments of FIG. 1A include at least one ACL Enforcer (106) in a single network device within the spine tier (110). The ACL Enforcer, which may be implemented in hardware, software, or any combination thereof, maintains the ACL and applies the ACL (or more specifically one or more of the rules/policies specified therein) to received frames. The ACL may be obtained from a network controller (not shown) and/or directly from an administrator of the data center.

In one embodiment of the invention, the spine tier may include multiple instances of the ACL enforcer, where each such instance includes the same ACL. In this scenario, the frames that are received by the spine tier that require application of the ACL (described below in FIGS. 4A, 4B) may be processed by any instance of the ACL enforcer without departing from the invention. Because the ACLs are stateless, they may process any frames received from any of the hosts. This enables the computational load related to the ACL Enforcer to be distributed across multiple network devices in the spine tier.

Enforcing the ACL policies in the spine tier may potentially favor systems with high bandwidth requirements between tenants in accordance with embodiments disclosed herein. Such embodiments would minimize sub-optimal forwarding and, thus, facilitate optimal use of bandwidth within the data center.

FIG. 1B shows a system in accordance with one or more embodiments disclosed herein. FIG. 1B is similar to FIG. 1A, with the exception of the placement of the ACL Enforcer (112). In the embodiments described by FIG. 1B, the ACL Enforcer (112) is located in a single network device (e.g., 102A) in the leaf tier.

In one embodiment of the invention, the leaf tier may include multiple instances of the ACL enforcer, where each such instance includes the same ACL. In this scenario, the frames that are received by the leaf tier that require application of the ACL (described below in FIGS. 4A, 4B) may be processed by any instance of the ACL enforcer without departing from the invention. Because the ACLs are stateless, they may process any frames received from any of the hosts. This enables the computational load related to the ACL Enforcer to be distributed across multiple network devices in the leaf tier.

In other embodiments, the ACL Enforcer (112) may be executing on a network device in the leaf tier that is not connected to any hosts. This embodiment may be implemented in scenarios in which the network devices in the leaf tier have fewer computing resources as compared to network devices in the spine tier and, as such, are only able to support operation of the ACL enforcer.

While FIGS. 1A and 1B show various configurations of network devices and hosts, the invention is not limited to the configurations shown in FIGS. 1A and 1B. For example, while the configuration shown in FIGS. 1A and 1B includes spine and leaf tiers, the invention is not limited to a two-tier hierarchical configuration; rather, embodiments of the invention may be implemented using any other configurations for a hierarchically-structured network without departing from the invention. Further, embodiments of the invention may also be implemented in non-hierarchically-structured networks (e.g., mesh networks) without departing from the invention.

Figure 2:
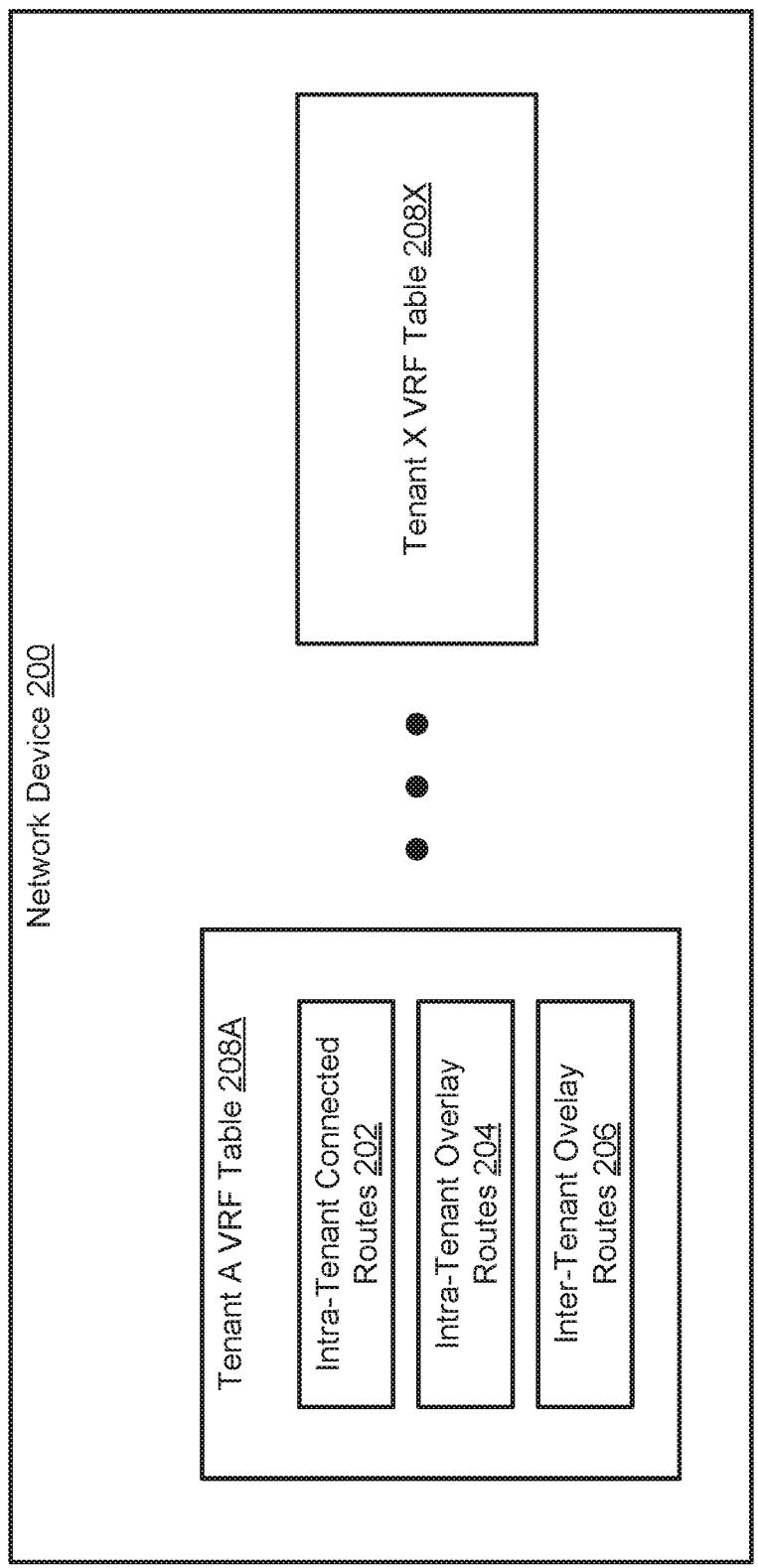
FIG. 2 shows a network device in accordance with one or more embodiments of the invention.

FIG. 2 is a diagram of a network device in accordance with one or more embodiments disclosed herein. The embodiments in FIG. 2 include a network device that may be implemented in the leaf tier and/or in the spine tier.

In one or more embodiments, a network device is implemented as a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (200) include, but are not limited to, a network switch, a router, a multilayer switch, a fiber channel device, an InfiniBand® device, etc. A network device (200) is not limited to the aforementioned specific examples.

In one or more embodiments, a network device (200) includes functionality to receive network data units (e.g., frames, encapsulated frames, etc.) at any of the physical network interfaces (i.e., ports) of the network device and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, decapsulate, etc.). Such a series of lookups and/or corresponding actions may be referred to as a pipeline processing. Examples of pipeline processing include, but are not limited to, performing a lookup to determine: (i) whether to take a security action (e.g., drop the network traffic data unit e.g., using an ACL); and/or (ii) determine how to route/forward the network traffic data unit in order to transmit the network traffic data unit from an interface of the network device. The network device (if it includes the ACL enforcer) may also include functionality to perform the method shown in FIG. 4B.

In one or more embodiments, a network device also includes and/or is operatively connected to device persistent storage and/or device memory (i.e., non-transitory computer readable mediums used to provide persistent storage resources and/or memory resources) storing software and/or firmware.

Such software and/or firmware may include instructions which, when executed by the one or more processors of a network device, cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device is part of a network (e.g., FIGS. 1A and 1B). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

Each of the network devices includes one or more per-tenant VRF tables (208A, 208X). The numbers per-tenant VRF tables associated with a tenant may correspond to the number of tenants that include hosts in the data center (or more generally the network of which the network device is a part). For example, if there are five tenants in the data center, then each network device may include five VRF tables, namely, one for each tenant. Alternatively, network devices that are directly connected to hosts (e.g., network devices in the leaf tier) may only have per-tenant VRF tables for any tenant that includes a host that is directly connected to the network device. For example, if a network device is connected to a host A associated with tenant A and host B associated with tenant B, then the network device would include two VRF tables—one for tenant A and one for tenant B.

Each Tenant VRF table (e.g., 208A, 208X) includes one or more of the following types of routes: intra-tenant connected routes (202), intra-tenant overlay routes (204), and inter-tenant overlay routes (206). Each of these route types is described below.

In one embodiment of the invention, the communication between hosts (associated with the same or different tenants) connected to different network devices may be enabled using an overlay network that includes one or more encapsulation paths (also referred to as network virtualization overlay (NVO) tunnels). The overlay network is a logical network that is configured on a physical network, where the overlay network may implement a different network topology than the underlying physical network. The overlay network may be implemented using NVO tunnels. NVO tunnels may use an Internet Protocol (IP) encapsulation, where the source IP address in the encapsulated frame identifies a source network device that is performing the encapsulation of the frame and the destination IP address in the encapsulated frame identifies a destination network device that is performing the decapsulation of the encapsulated frame. Non-limiting examples of IP encapsulation protocols that may be used for IP encapsulation include Multi-Protocol Label Switching (MPLS) protocol, MPLS over User Datagram Protocol, MPLS over Generic Network Encapsulation, virtual extensible local area network (VXLAN) protocol, and Network Virtualization Using Generic Routing Encapsulation (NVGRE).

The network devices may encapsulate frames and then send encapsulated frames to other network devices (see e.g., FIGS. 6A-7B) using route information in the VRFs located thereon. The following describes the various types of route information that may be present in the VRFs within a network device.

Referring to FIG. 2, intra-tenant connected routes (202) include routes to hosts for a particular tenant that are connected to the Network Device (200). These routes enable hosts that are associated with the same tenant and connected to the same network device to communicate with each other. The intra-tenant routes do not include any encapsulation information and, as such, frames that are routed using the intra-tenant routes are not transmitted via the overlay network.

Intra-tenant overlay routes (204) are routes to the hosts for a particular tenant that are connected to different network devices in the data center (or network). These routes include encapsulation information required to encapsulate the frames received from a source host (i.e., a host from which a frame was initially transmitted) and to transmit the encapsulated frames towards the other network device(s) that is directly connected to a target host (i.e., the host to which the frame transmitted by the source host is destined). The encapsulation information may be a virtual network identifier (VNI) if the encapsulation path tunnel is a VXLAN tunnel. The encapsulation information corresponds to information required to transmit the resulting encapsulated frame on the encapsulation path of the tenant with which the source host is associated.

Inter-tenant overlay routes (206) include routes from hosts of a first tenant to hosts of other tenants, where these hosts may be connected to the same or different network devices in the data center (or network). These routes include information required to encapsulate the frames received from a source host (i.e., a host from which a frame was initially transmitted) and to transmit the encapsulated frames towards the network device that includes the ACL enforcer. For example, if host A associated with tenant A is able to communicate with host B associated with tenant B, then the VRF table for tenant A on the network device includes a route to enable a frame from Host A to be transmitted towards host B via the ACL enforcer. Additional detail about the operation of the network devices and the ACL enforcer is provided below in FIGS. 4A and 4B. The encapsulation information may be a virtual network identifier (VNI) if the encapsulation path tunnel is a VXLAN tunnel. The encapsulation information corresponds to information required to transmit the resulting encapsulated frame on the encapsulation path of the tenant with which the destination host is associated.

In one embodiment of the invention, the routes in the VRF table may be locally learned (e.g., in the case of directly connected hosts) or may be learned using other route publication mechanisms for remotely learned routes. For example, the remotely learned routes, e.g., the intra-tenant overlay routes and the inter-tenant overlay routes may be learned using mechanisms provided by Ethernet Virtual Private Network (EVPN). For example, intra-tenant routes may be learned by network devices using Type 5 Routes in accordance with EVPN.

Further, inter-tenant overlay routes may be obtained via inter-VRF local route leaking. The route leaking enables certain routes associated with one tenant to be included in a VRF table associated with another tenant. In this manner, hosts associated with different tenants may be able to communicate. The inter-VRF local route leaking may be performed using Border Gateway Protocol (BGP) VPN or another mechanism without departing from the invention.

In one embodiment of the invention, routes from a first tenant may be imported into a VRF table for the second tenant on the network device that includes ACL enforcer. As part of the importing process, the imported routes from a first tenant along with their original encapsulation information is included in a VRF of the second tenant that is maintained by the network device (i.e., the network device that includes the ACL enforcer). The imported routes are also programmed into the network device. In addition, the imported routes are re-originated by the network device. These re-originated routes include encapsulation information for the second tenant and the next hop as the network device.

The following is a non-limiting example of the importing process. Consider a scenario in which tenant A and tenant B implement VXLAN, where tenant A uses VNI A (as its encapsulation information) and tenant B uses VNI B (as its encapsulation information). Further, a network device that includes the ACL enforcer includes VRF Table A for tenant A and VRF Table B for tenant B. When routes from tenant A are imported into VRF table B, the imported routes are stored in VRF B, where the routes maintain VNI A as the encapsulation information. In addition, the imported routes are re-originated from the network device, where re-originated routes include VNI B as the encapsulation information and specify the network device as the next hop. The re-originated routes direct encapsulated frames (which are originating from a host in tenant B that are destined for a host in tenant A) from leaf network devices to the aforementioned network device.

In one embodiment of the invention, the specific routes that are leaked (or otherwise shared) between the different tenants may be specified by an administrator and/or by a network controller (or another component of the network or operatively connected to the network) based on a policy(ies) set by an administrator.

In one embodiment of the invention, the re-originated routes may be sent to other network devices in the system using, e.g., EVPN or any other route publishing or distribution mechanism.

As discussed above, some of the frames transmitted between hosts are encapsulated. The encapsulation may be performed using an encapsulation protocol such as Generic Routing Encapsulation (GRE) or Virtual Extensible Local Area Network (VXLAN). Other encapsulation protocols may be used without departing from the invention.

Figure 3:
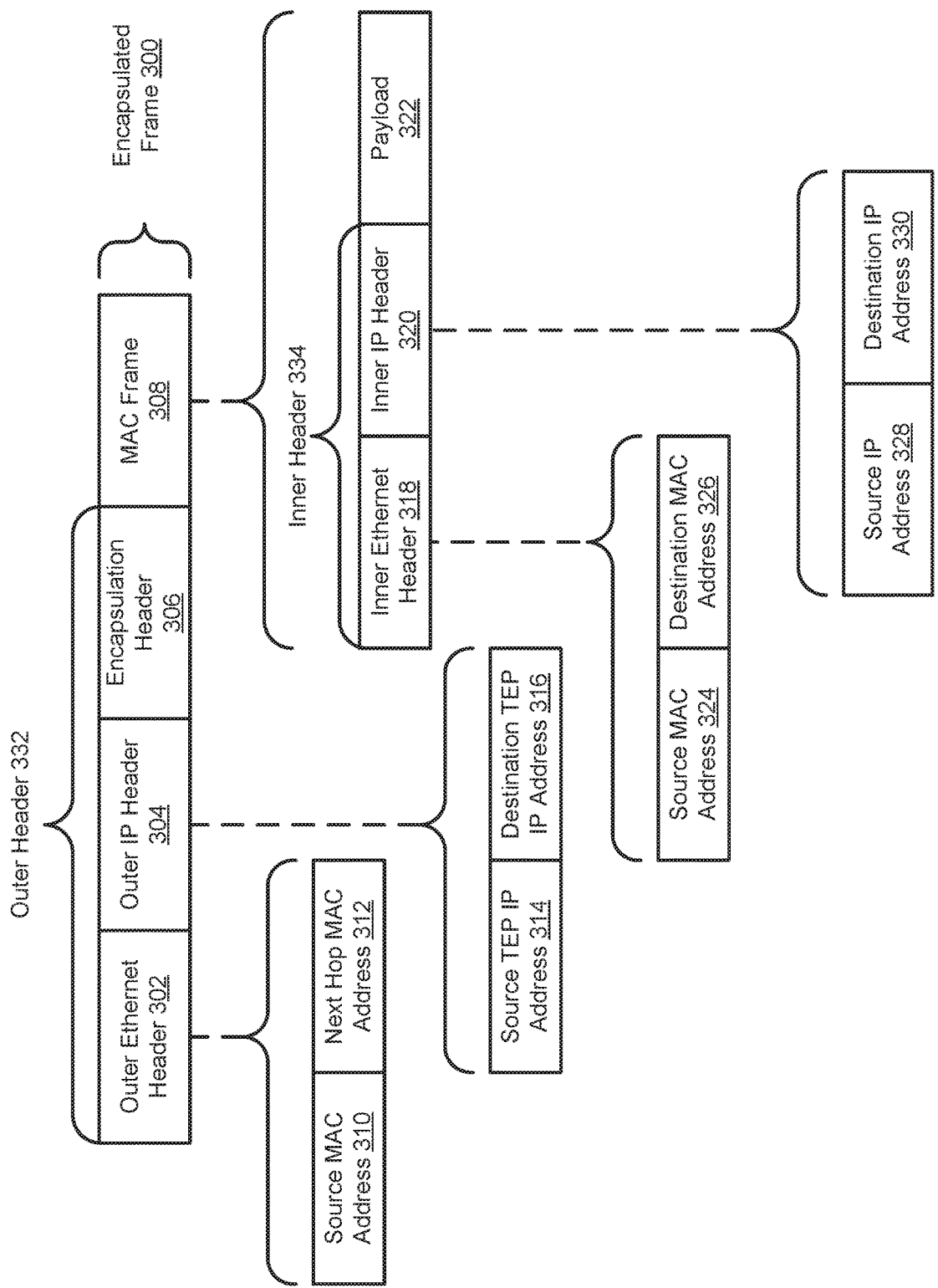
FIG. 3 shows an encapsulated frame in accordance with one or more embodiments of the invention.

FIG. 3 shows an exemplary encapsulated frame in accordance with one or more embodiments of the invention. The encapsulated frame (300) shown in FIG. 3 includes: (i) a media access control (MAC) frame (also referred to as a frame) (308), (ii) an encapsulation header (306), (iii) an outer Internet Protocol (IP) header (304), and (iv) and an outer Ethernet header (302) (which is a non-limiting example of a layer-2 header). Each of the aforementioned components is described below.

In embodiments disclosed herein, the MAC frame (308) is generated by a source host and may include an inner header (334) and a payload (322). The payload (322) may include the content that the source host is attempting to transmit to the destination (or target) host. The inner IP header (320) includes a source IP address (328) and a destination IP address (330). The MAC frame may include other information/content without departing from the invention.

In embodiments disclosed herein, the encapsulation header (306) may include, but is not limited to, a virtual network identifier (VNI) if the encapsulation protocol is VXLAN. The encapsulation header scopes the MAC frame (308) originated by the network device that encapsulated the MAC Frame (308) such that the MAC frame (308) may only be received by a network device associated (via an Tunnel Endpoint (TEP), e.g., a virtual tunnel endpoint if VXLAN encapsulation is used)) with the same (or corresponding) encapsulation header. The encapsulation header may include additional and or different information/content without departing from the invention.

In embodiments disclosed herein, the outer Ethernet header (302) and the outer IP header (304) are used to route the encapsulated frame from the source network device (i.e., the network device that performed the encapsulation and, e.g., includes a source TEP) to the destination network device (i.e., the network device that performs the decapsulation and, e.g., includes the destination TEP). If the encapsulation protocol is VXLAN, then the TEPs are virtual tunnel endpoints (VTEPs). To this end, the outer Ethernet header (302) includes the source MAC address (310) and the next hop MAC address (312), and the outer IP header (304) includes the source TEP IP address (314) (i.e., an IP address associated with the source TEP) and the destination TEP IP address (316) (i.e., an IP address associated with the destination TEP). The aforementioned components may include other information/content without departing from the invention. The outer Ethernet header (302), the outer IP header (304), and the encapsulation header (306) may be collectively referred to as an outer header (332).

The encapsulated frame may include other components without departing from the invention. The encapsulated frame may be, for example, a VXLAN frame.

In one embodiment of the invention, the IP address listed above may be an IPv4 or IPv6 address without departing from the invention.

Figure 4A:
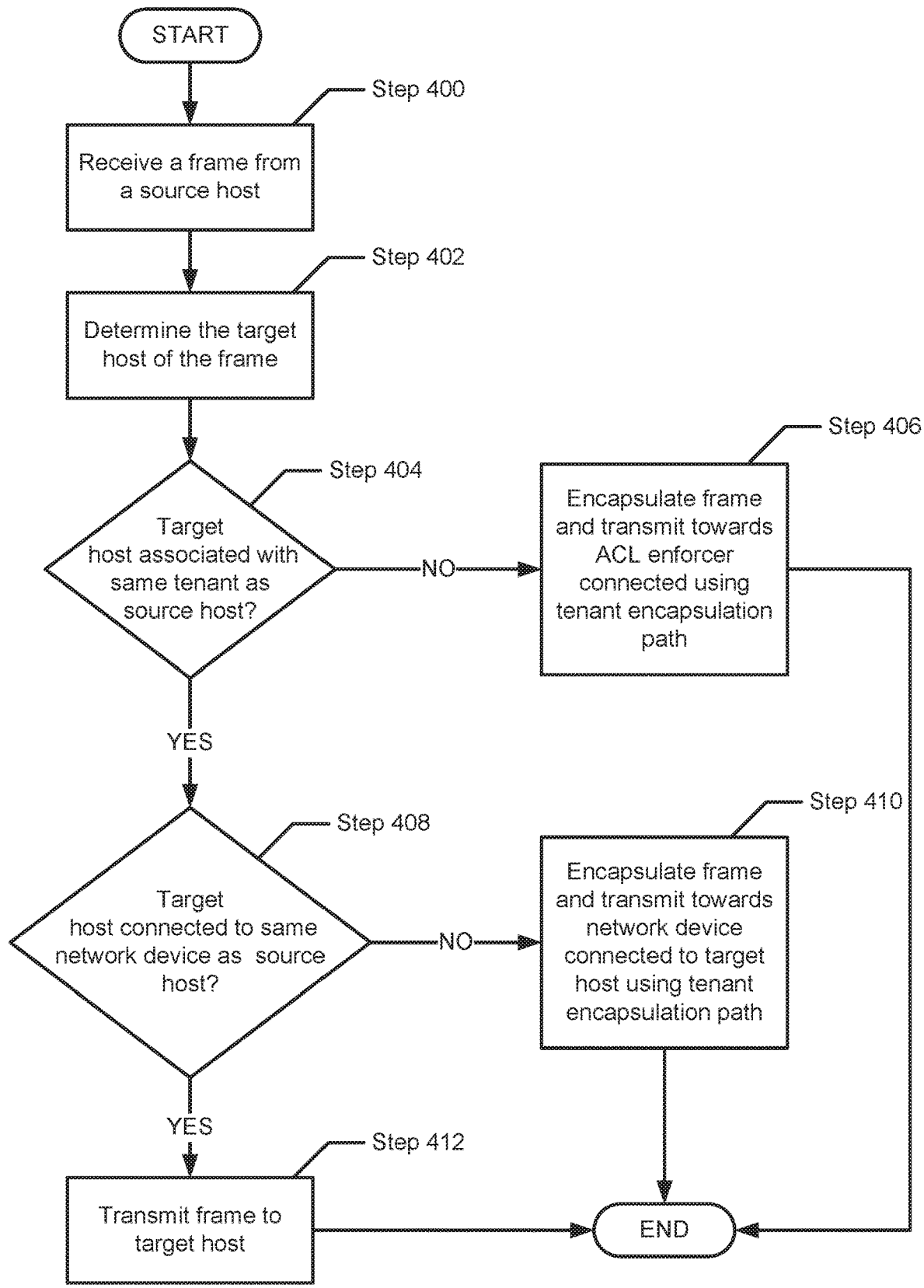
FIG. 4A shows a flowchart in accordance with one or more embodiments of the invention.
Figure 4B:
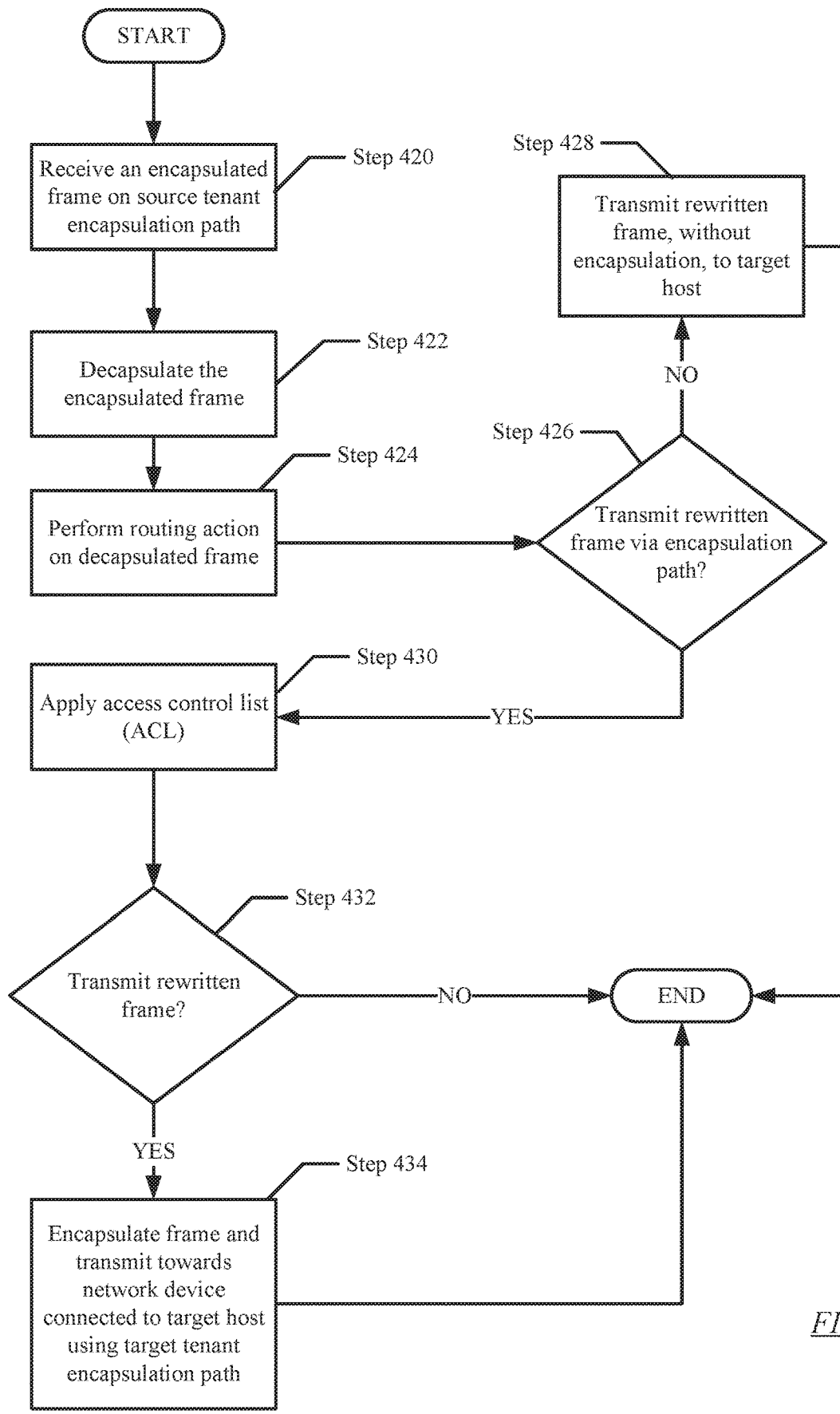
FIG. 4B shows flowchart in accordance with one or more embodiments of the invention.

FIGS. 4A and 4B describe methods in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. Further, the methods shown in FIGS. 4A and 4B may be performed concurrently by different network devices within the system.

FIG. 4A shows a process of receiving a frame from a host and then processing the received frame in accordance with one or more embodiments of the invention.

In step 400, a frame is received from a source host. The frame may include the source host MAC address, target host MAC address, the source host IP address and the target host IP address. The target host IP address may be an IP address of a host that may or may not be associated with a tenant with which the source host is associated.

In step 402, the network device determines the target destination host from the received frame. The processing in step 402 may include analyzing the target host IP address in the received frame.

In Step 404, a determination is made about whether the target host is associated with the same tenant as the source host. This determination may be made by performing a lookup in the VRF table for the tenant associated with the source host. The target host may be deemed to be associated with the same tenant when there is either intra-tenant connected route or an intra-tenant overlay route in the VRF table that matches the target host IP address. The target host may be deemed not associated with the same tenant when there is an inter-tenant overlay route in the VRF table that matches the target host IP address. Those skilled in the art will appreciate that if there is no route matching the target host IP address in the aforementioned VRF table then the frame may be dropped.

If the target host is associated with the same tenant as the source host, the process proceeds to step 408; otherwise, the process proceeds to step 406.

In step 406, when the target host is associated with a different tenant then the tenant with which source host is associated, then the frame received from the source host is encapsulated to generate an encapsulated frame (e.g., an encapsulated frame such as one shown in FIG. 3) and then transmitted towards the network device that includes the ACL enforcer. Because the encapsulated frame is to be decapsulated by the network device that includes the ACL enforcer, the destination MAC address and destination IP address in the outer header of the encapsulation frame correspond to the MAC address and IP address associated with the network device that includes the ACL enforcer. The information necessary to encapsulate the frame is included in the matching inter-tenant overlay route in the VRF table (i.e., the VRF table that was used to make the determination in step 404). The encapsulated frame is transmitted via the tenant encapsulation path (i.e., the encapsulation path corresponding to the tenant with which the source host is associated). In one embodiment of the invention, the encapsulation path is a VXLAN tunnel associated with the tenant with which the source host is associated. The process then ends.

Returning to step 404, when the target host is associated with the same tenant as the source host, then in step 408, a determination is made about whether the target host is connected to the same network device as the source host. The determination in step 404 may be performed using the VRF table associated with the source host, where the determination is based on whether the target host matches an intra-tenant connected route in the aforementioned VRF table. If the target host is connected to the same network device as the source host, the process proceeds to step 412; otherwise, the process proceeds to step 410.

In step 410, when the target host is associated with the same tenant as the source host but is connected to a different network device then the frame received from the source host is routed into the IP subnet associated with the target host (which is in a different IP subnet than the source host, but is associated with the same tenant as the source host). More specifically, the routing of the frame received from the source host results in the inner layer-2 header of the frame being rewritten to specify that destination MAC address is the MAC address of the network device that is connected to the target host. This information is included within the matching intra-tenant route in the VRF table (i.e., the VRF table that was used to make the determination in step 404). The resulting frame (referred to as a rewritten MAC frame) is then encapsulated to generate an encapsulated frame (e.g., an encapsulated frame such as one shown in FIG. 3) and then transmitted to the network device that is directly connected to the target host. The information necessary to encapsulate the rewritten frame is included in the matching intra-tenant overlay route in the VRF table (i.e., the VRF table that was used to make the determination in step 404). The encapsulated frame is transmitted via the tenant encapsulation path (i.e., the encapsulation path corresponding to the tenant with which the source host is associated). In one embodiment of the invention, the encapsulation path is a VXLAN tunnel associated with the tenant with which the source host is associated. The process then ends.

In Step 412, when the target host is connected to the same network device as the source host, then the frame (which may or may not be rewritten by the network device) is transmitted to the target host. The process then ends.

FIG. 4B shows a process performed by the network device that includes the ACL enforcer in accordance with one or more embodiments of the invention.

In step 420, an encapsulated frame is received by the network device that includes the ACL enforcer.

In step 422, the encapsulated frame is decapsulated to obtain frame (which corresponds to the frame that was encapsulated in step 406).

In step 424, a routing action is performed on the frame using the VRF table associated with the source host (or, more specifically, the VRF table associated with the encapsulation information of the tenant with which the source host is associated). The result of step 424 is a rewritten MAC frame. The information necessary to perform the routing action and generate the rewritten MAC frame may be included in the matching route within the aforementioned VRF table.

In step 426, a determination is made about whether the rewritten frame needs to be encapsulated prior to its transmission to the target host. This determination may be made using information in the matching route within the aforementioned VRF table. For example, if the matching route specifies encapsulation information (e.g., a VNI or other encapsulation information), then the rewritten frame needs to be encapsulated prior to transmission. If the rewritten frame needs to be encapsulated prior to its transmission to the target host, the process proceeds to step 430; otherwise, the process proceeds to step 428.

In step 428, the rewritten frame is transmitted to the target host without encapsulation. The process then ends.

Returning to step 426, when the rewritten frame needs to be encapsulated prior to its transmission to the target host, then in step 430, the ACL enforcer applies the ACL to the rewritten frame. Application of the ACL may include, but is not limited to, identifying a rule(s) that matches the rewritten frame in the ACL and then performing the action associated with the rule.

In step 432, a determination is made about whether to transmit the rewritten frame based on the processing in step 426. If the resulting action in step 426 permits the rewritten frame to be transmitted, then the process proceeds to step 432; otherwise, the process ends.

In step 434, the rewritten frame (referred to a rewritten MAC frame) is then encapsulated to generate an encapsulated frame (e.g., an encapsulated frame such as one shown in FIG. 3) and then transmitted to the network device that is directly connected to the target host. The information necessary to encapsulate the rewritten frame is included in the matching inter-tenant overlay route in the VRF table (i.e., the VRF table for the tenant with which the source host is associated). The encapsulated frame is transmitted via the tenant encapsulation path (i.e., the encapsulation path corresponding to the tenant with which the target host is associated). In one embodiment of the invention, the encapsulation path is a VXLAN tunnel associated with the tenant with which the target host is associated.

The following section describes various non-limiting examples in accordance with one or more embodiments of the invention.

Example

Figure 5:
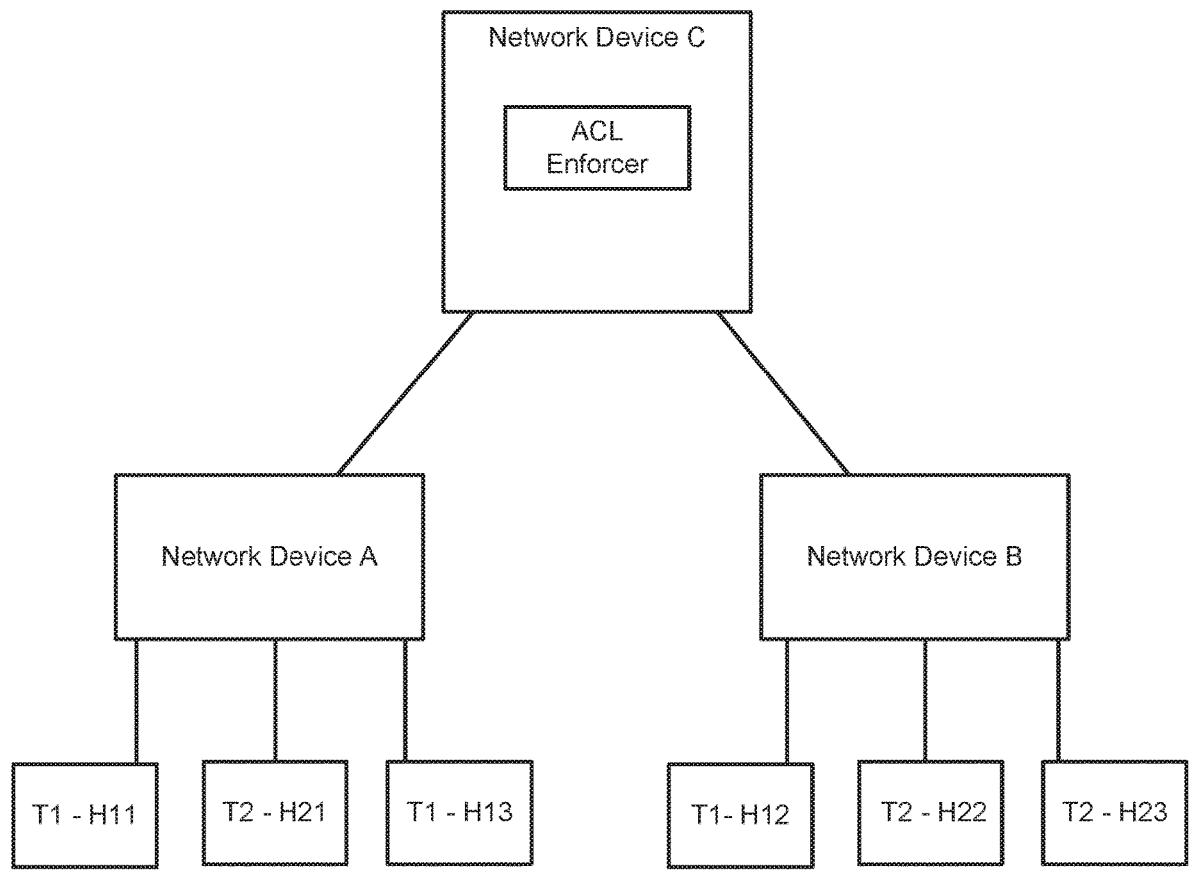
FIG. 5 shows an exemplary system in accordance with one or more embodiments of the invention.

FIG. 5 is an exemplary system in accordance with one or more embodiments of the invention. Examples described in FIGS. 6A-7B are based on the system shown in FIG. 5.

Turning to the system shown in FIG. 5, the system includes six hosts (H11, H12, H13, H21, H22, H23), where each of the hosts is associated with either tenant 1 (T1) or tenant 2 (T2). For example, H11 is associated with T1, which is denoted as H11 in FIG. 5. Further, each of the hosts are associated with different subnets. With respect to connectivity within the system, hosts H11, H21, and H13 are connected to network device A and hosts H12, H22, and H23 are connected to network device B. Finally, network device C is directly connected to network devices A and B. In this example, network device C includes the ACL enforcer.

Though not shown in FIG. 5, each of the network devices includes two VRF tables—one VRF table for T1 and one VRF table for T2. Further, T1 leaks routes to enable hosts in T2 to communicate with H11 and H12. Similarly, T2 leaks routes to enable hosts in T1 to communicate with H22 and H23. Finally, the aforementioned VRF tables are configured such that: (i) any network traffic between hosts associated with different tenants is directed to network device C; (ii) any network traffic between hosts of T1 connected to different network devices is transmitted via VXLAN using VNI A; (iii) any network traffic between hosts of T2 connected to different network devices is transmitted via VXLAN using VNI B; (iv) any network traffic that is directed to network device C for processing by the ACL enforcer is transmitted via VXLAN using the VNI of the tenant with which the source host is associated; and (v) any network traffic that is permitted to be transmitted after processing by the ACL enforcer is transmitted via VXLAN using the VNI of the tenant with which the target host is associated.

Scenario 1

Figure 6A:
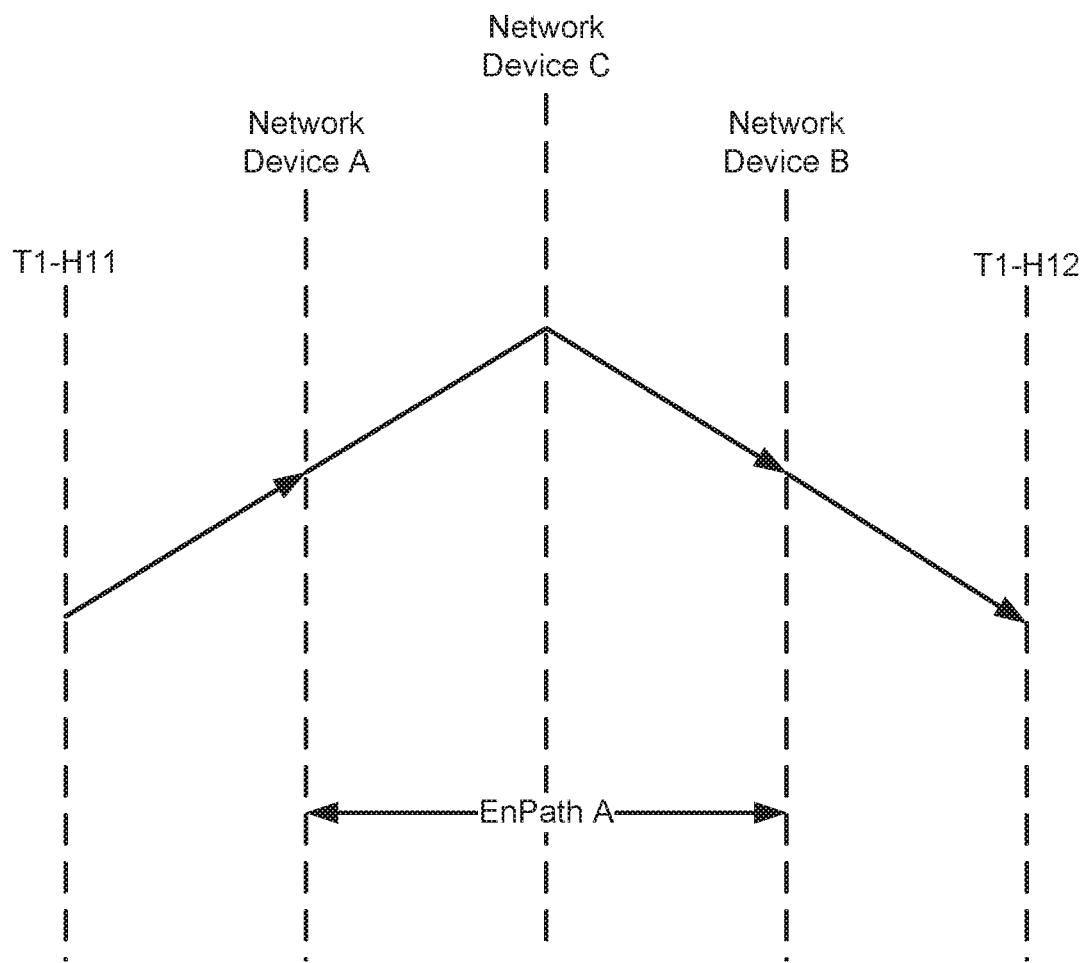
FIG. 6A shows an exemplary path in accordance with one or more embodiments of the invention.

Consider a scenario in which H11 generates and transmits a payload to H12. FIG. 6A shows an exemplary path of the aforementioned a payload transmitted in accordance with one or more embodiments of the invention. FIG. 6A demonstrates an intra-tenant transfer of a payload. The exemplary path of FIG. 6A may be used in accordance with the methods described in FIG. 4A. The components shown in FIG. 6A correspond to the components of FIG. 5, as well as FIGS. 1A and 1B. The frames transmitted between the components are demonstrated in FIG. 6B.

Figure 6B:
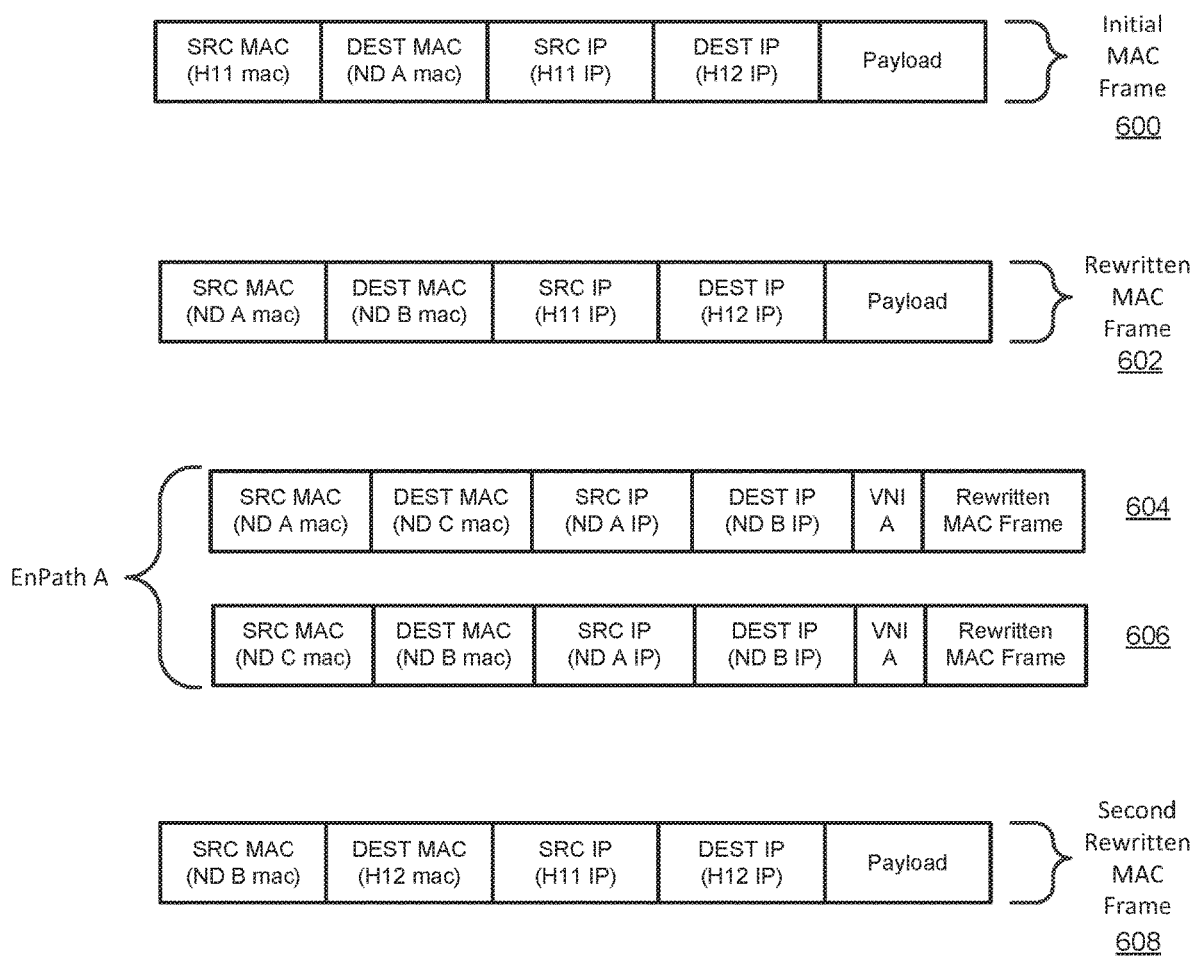
FIG. 6B demonstrates different frames along the exemplary path shown in FIG. 6A in accordance with one or more embodiments of the invention.

Turning to FIG. 6A, while also referring to FIG. 6B, the Initial MAC Frame (600), including the payload, is generated and transmitted by H11 to Network Device A. Network Device A routes the Initial MAC Frame (600) using a VRF table associated with T1 to generate a Rewritten MAC Frame (602). Network Device A then encapsulates the Rewritten MAC Frame and transmits the resulting encapsulated frame (604) to Network Device C using encapsulation path (EnPath A), which is a VXLAN tunnel that uses VNI A. Upon arriving at Network Device C, the outer header of the encapsulated frame is modified and the resultant encapsulated frame (606) is then transmitted along EnPath A to Network Device B. Upon receipt, Network Device B decapsulates the encapsulated frame to obtain the rewritten frame (602) and then routes (using the VRF table associated with T1) the rewritten frame (602) to generate the Second Rewritten MAC frame (608). The Second Rewritten MAC frame is then transmitted to H12.

Scenario 2

Figure 7A:
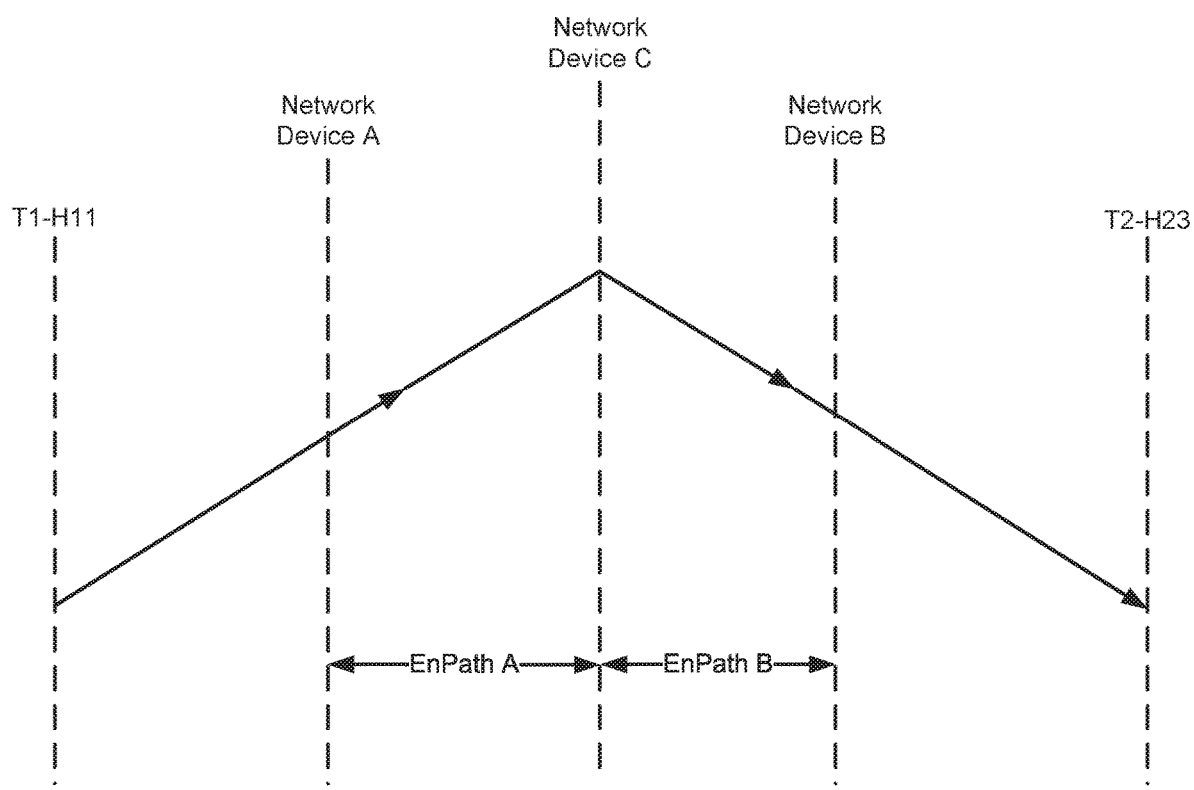
FIG. 7A shows an exemplary path in accordance with one or more embodiments of the invention.

Consider a scenario in which HI generates and transmits a payload to H23. FIG. 7A shows an exemplary path of a payload transmitted in accordance with one or more embodiments of the invention. FIG. 7A demonstrates an inter-tenant transfer of a payload. The exemplary path of FIG. 7A may be used in accordance with the methods described in FIGS. 4A-4B. The components shown in FIG. 7A correspond to like named components in FIG. 5, as well as FIGS. 1A and 1B. The frames transmitted between the components are demonstrated in FIG. 7B.

Figure 7B:
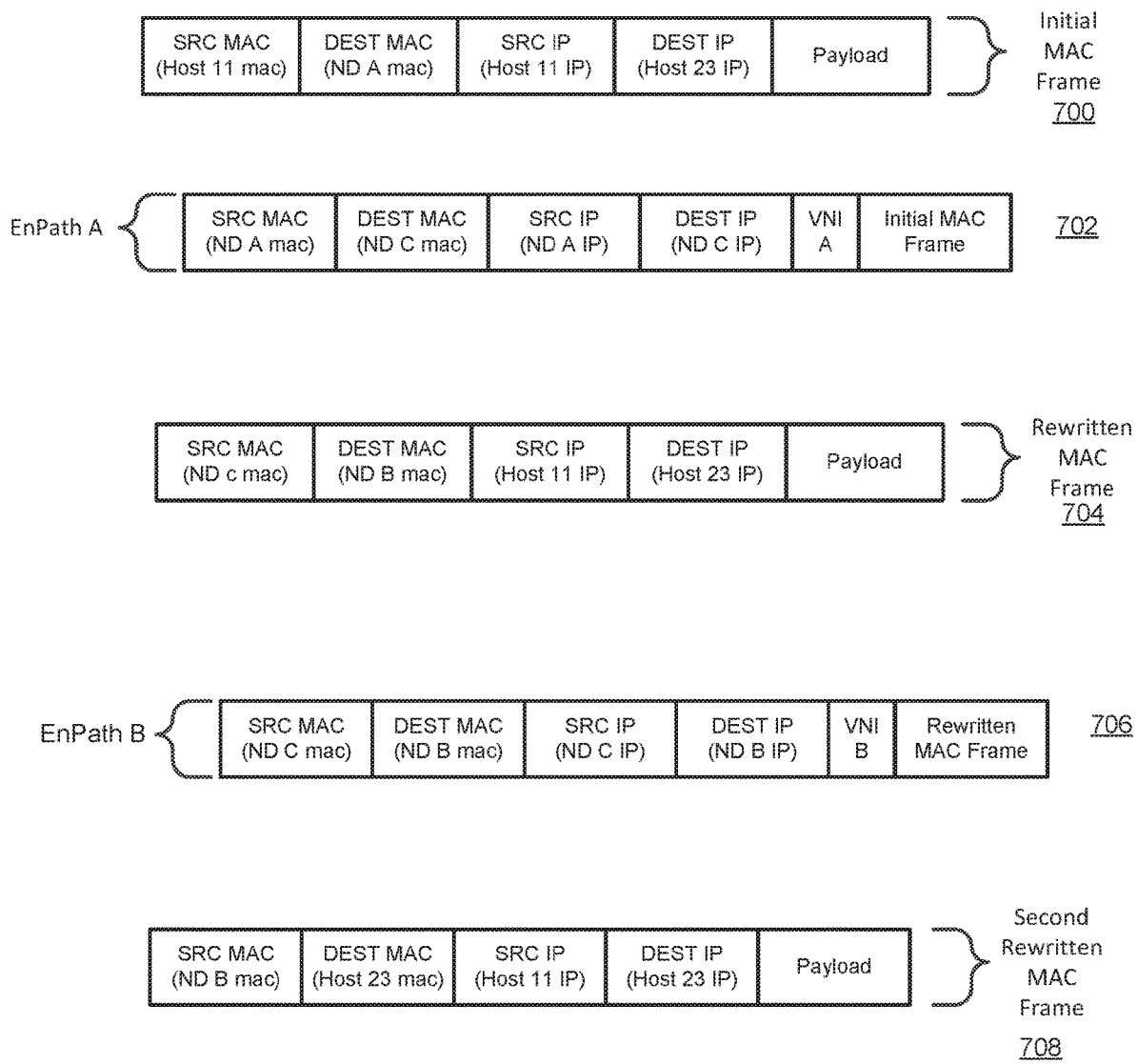
FIG. 7B demonstrates different frames along the exemplary path shown in FIG. 7A in accordance with one or more embodiments of the invention.

Turning to FIG. 7A, while also referring to FIG. 7B, the Initial MAC Frame (700), including the payload, is transmitted by H11 to Network Device A. Network Device A encapsulates the Initial MAC Frame to generate an encapsulated frame (702) and transmits the encapsulated frame to Network Device C using an encapsulation path EnPath A, which is a VXLAN tunnel that uses VNI A. The route in the VRF table that is used to generate the encapsulated frame is a re-originated route generated by network device C, where the re-originated route resulted from modifying an imported route from tenant B. Upon arriving at Network Device C, the encapsulated frame (702) is decapsulated to obtain the Initial MAC Frame (700). The Initial MAC Frame (700) is then routed using a VRF table associated with T1 (i.e., the tenant with which the H11 is associated) to generate a Rewritten MAC Frame (704).

The ACL enforcer then applies the ACL to the Rewritten MAC Frame (704). In this scenario, the Rewritten MAC Frame (704) is permitted to be transmitted to H23. As a result, the Rewritten MAC Frame is encapsulated to generate an encapsulated frame (706). The encapsulated frame (706) is transmitted to the Network Device B using the encapsulation path EnPath B, which is a VXLAN tunnel that uses VNI B. Upon receipt, Network Device B decapsulates the encapsulated frame and then routes (using the VRF table associated with T2) the Rewritten MAC Frame (704) to generate the Second Rewritten MAC frame (708). The Second Rewritten MAC frame is then transmitted to H23.

End of Example

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing frames in a hierarchically-structured network that includes a plurality of hosts, wherein at least one host of the plurality of hosts is associated with a first tenant and at least one host of the plurality of hosts is associated with a second tenant, and wherein the method is performed by a network device in the network, the method comprising:
   receiving an encapsulated frame on a first encapsulation path, wherein the first encapsulation path is associated with the first tenant;
   decapsulating the encapsulated frame to obtain a frame;
   routing the frame using a virtual routing and forwarding (VRF) table associated with the first tenant to obtain a rewritten frame;
   determining, based on applying an access control list (ACL) to the rewritten frame, to transmit the rewritten frame to a target host associated with the second tenant, wherein the target host is one of the plurality of hosts;
   based on the determining, encapsulating the rewritten frame to generate a second encapsulated frame; and
   transmitting the second encapsulated frame towards the target host on a second encapsulation path, wherein the second encapsulation path is associated with the second tenant.

2. The method of claim 1, further comprising:
   receiving a third encapsulated frame on the first encapsulation path, wherein the third encapsulated frame comprises a second frame specifying a second target host associated with the first tenant, wherein the second target host is one of the plurality of hosts;
   updating an outer layer-2 header of the third encapsulated frame to obtain a fourth encapsulated frame; and
   transmitting the fourth encapsulated frame towards the second target host on the first encapsulation path.

3. The method of claim 1, wherein the first encapsulation path and the second encapsulation path are virtual extensible local area network (VXLAN) tunnels.

4. The method of claim 1, wherein the hierarchically-structured network comprises a spine tier and a leaf tier, wherein the ACL is implemented in a network device in the spine tier.

5. The method of claim 4, the ACL is one of a plurality of ACLs implemented in the spine tier.

6. The method of claim 1, wherein the hierarchically-structured network comprises a spine tier and a leaf tier, wherein the ACL is implemented in a network device in the leaf tier.

7. The method of claim 1, wherein the frame is generated by a network device in the hierarchically-structured network connected to a source host, wherein the source host is one of the plurality of hosts, and wherein the source host is associated with the first tenant.

8. The method of claim 1, wherein at least one route in the VRF table is imported from a second VRF table on the network device, wherein the second VRF table is associated with the second tenant, wherein the at least one route comprises encapsulation information associated with the second tenant, wherein the second encapsulated frame is generated using the at least one route.

9. The method of claim 7, further comprising:
   prior to receiving the encapsulated frame:
   re-originating the at least one route to obtain at least one re-originated route, wherein the at least one re-originated route comprises encapsulation information associated with the first tenant and specifies the network device as the next hop,
   wherein the encapsulated frame is generated using the at least one re-originated route.

10. A network device, comprising:
    a processor,
    memory comprising instructions, which when executed by the processor, perform a method for processing frames, the method comprising:
       receiving an encapsulated frame on a first encapsulation path, wherein the first encapsulation path is associated with the first tenant;
       decapsulating the encapsulated frame to obtain a frame;
       routing the frame using a virtual routing and forwarding (VRF) table associated with a first tenant to obtain a rewritten frame;
       determining, based on applying an access control list (ACL) to the rewritten frame, to transmit the rewritten frame to a target host associated with the second tenant;
       based on the determining, encapsulating the rewritten frame to generate a second encapsulated frame; and
       transmitting the second encapsulated frame towards the target host on a second encapsulation path, wherein the second encapsulation path is associated with the second tenant.

11. The network device of claim 10, wherein the network device is part of a hierarchically-structured network comprising a spine tier and a leaf tier, wherein the network device is in the spine tier.

12. The network device of claim 10, wherein the network device is part of a hierarchically-structured network comprising a spine tier and a leaf tier, wherein the network device is in the leaf tier.

13. The network device of claim 10, wherein the frame is generated by a network device in the hierarchically-structured network connected to a source host, wherein the source host is one of the plurality of hosts, and wherein the source host is associated with the first tenant.

14. The network device of claim 10, wherein at least one route in the VRF table is imported from a second VRF table on the network device, wherein the second VRF table is associated with the second tenant, wherein the at least one route comprises encapsulation information associated with the second tenant, wherein the second encapsulated frame is generated using the at least one route.

15. The network device of claim 14, wherein the method further comprises:
    prior to receiving the encapsulated frame:
    re-originating the at least one route to obtain at least one re-originated route, wherein the at least one re-originated route comprises encapsulation information associated with the first tenant and specifies the network device as the next hop,
    wherein the encapsulated frame is generated using the at least one re-originated route.

16. A method for processing frames, the method comprising:
- receiving an encapsulated frame, wherein the encapsulated frame is associated with a first tenant;
- decapsulating the encapsulated frame to obtain a frame;
- routing the frame using a virtual routing and forwarding (VRF) table associated with a first tenant to obtain a rewritten frame;
- determining, based on applying an access control list (ACL) to the rewritten frame, to transmit the rewritten frame to a first host associated with the second tenant;
- based on the determining, encapsulating the rewritten frame to generate a second encapsulated frame, wherein the second encapsulated frame is associated with the second tenant; and
- transmitting the second encapsulated frame towards the first host.

17. The method of claim 16, further comprising:
- receiving a third encapsulated frame, wherein the third encapsulated frame comprises a second frame specifying a second host associated with the first tenant as a destination of the second frame;
- updating an outer layer-2 header of the third encapsulated frame to obtain a fourth encapsulated frame; and
- transmitting the fourth encapsulated frame to towards the second host.

18. The method of claim 16, wherein the encapsulated frame is received via a first encapsulation path associated with a first tenant and the second encapsulation frame is transmitted via a second encapsulation path associated with the second tenant.

19. The method of claim 16, wherein ACL is implemented in a network device, wherein the network device is located in a spine tier of a hierarchically-structured network.

20. The method of claim 16, wherein at least one route in the VRF table is imported from a second VRF table on the network device, wherein the second VRF table is associated with the second tenant, wherein the at least one route comprises encapsulation information associated with the second tenant, wherein the second encapsulated frame is generated using the at least one route.

* * * * *